E. HARRIS.
RETREAD VULCANIZER.
APPLICATION FILED DEC. 5, 1918.

1,301,431.

Patented Apr. 22, 1919.
2 SHEETS—SHEET 1.

INVENTOR.
EDWARD HARRIS
BY
*Hazard & Miller*
ATTORNEYS.

E. HARRIS.
RETREAD VULCANIZER.
APPLICATION FILED DEC. 5, 1918.
1,301,431.
Patented Apr. 22, 1919.
2 SHEETS—SHEET 2.
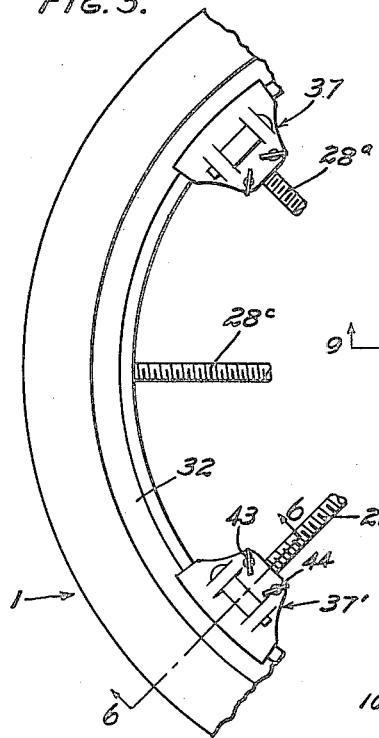
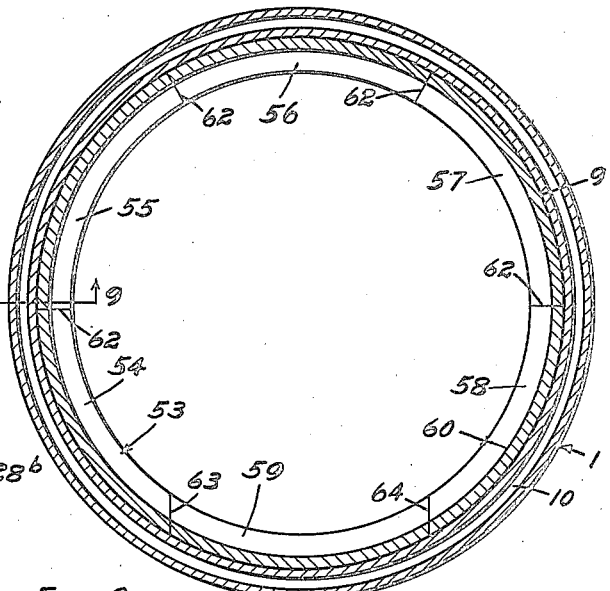
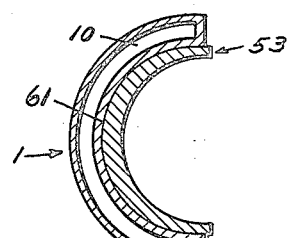
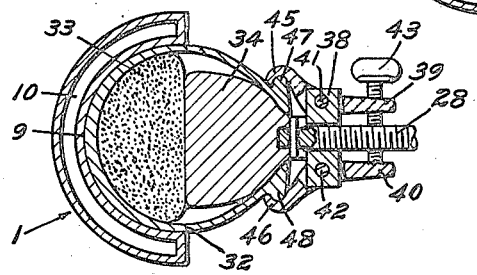
INVENTOR.
EDWARD HARRIS
BY
*Hazard & Miller*
ATTORNEYS.

UNITED STATES PATENT OFFICE.

EDWARD HARRIS, OF LOS ANGELES, CALIFORNIA.

RETREAD-VULCANIZER.

1,301,431. Specification of Letters Patent. Patented Apr. 22, 1919.

Application filed December 5, 1918. Serial No. 265,450.

*To all whom it may concern:*

Be it known that I, EDWARD HARRIS, a citizen of the United States, residing at Los Angeles, in the county of Los Angeles and State of California, have invented new and useful Improvements in Retread-Vulcanizers, of which the following is a specification.

My invention relates to retread vulcanizers and consists of the novel features herein shown, described and claimed.

The principal object of my invention is to vulcanize the complete retread upon a tire casing at one operation.

Another object of my invention is to make a mold in a single piece which will take an entire tire casing and vulcanize the complete retread at one operation.

A further object of my invention is to make and mount a mold which will take an entire tire casing at one operation and arrange the compression screws to be operated singly or in multiples.

A further object of my invention is to make a mold which will take an entire tire casing in one operation and provide a sectional shell which will take an entire tire casing of a smaller size.

A further object of my invention is to provide a one piece mold which will take an entire tire casing and provide means for pulling the tire casing out of the mold.

Fig. 5 is an enlarged fragmentary plan similar to Fig. 1 and showing the details of the pulling mechanism mounted upon the compression screws and engaging the beads of a tire casing and ready to pull the tire casing from the mold.

Fig. 6 is an enlarged fragmentary cross sectional detail on the line 6—6 of Fig. 5 and showing a pulling mechanism adapted to engage the beads of quick detachable casings.

Fig. 7 is a view analogous to Fig. 6 and showing the pulling mechanism engaging straight side beads.

Fig. 8 is a plan section of the mold and showing a sectional shell inserted into the mold to reduce the size of the mold for smaller casings.

Figure 1:
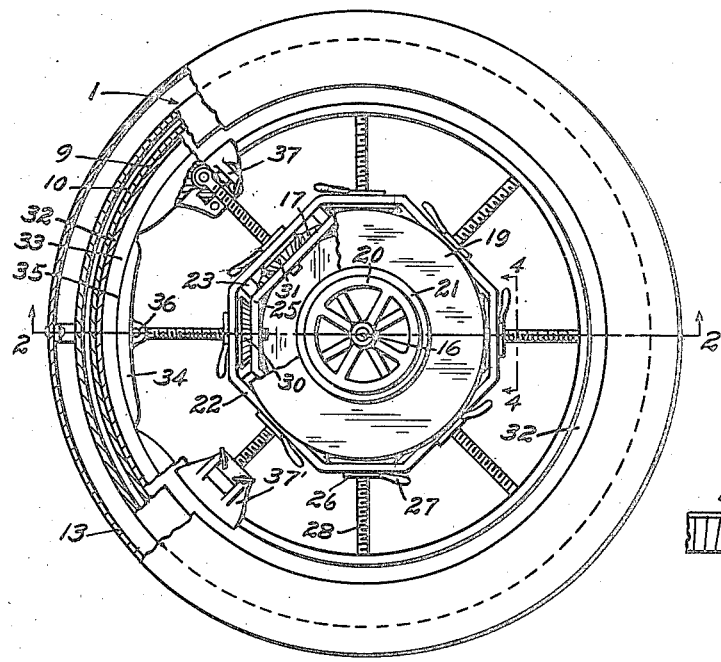
Figure 1 is a top plan view of a retread vulcanizer embodying the principles of my invention, parts being broken away and shown in section and the view being taken looking in the direction indicated by arrow 1 in Fig. 2.
Figure 3:
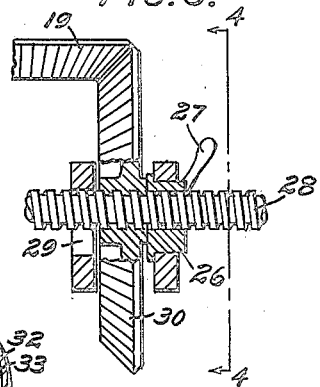
Fig. 3 is an enlarged fragmentary sectional detail on the same plane as Fig. 2 and showing the connection between the compression screw and the screw threaded gear, and showing the throw off mechanism, the view being taken on the line 3—3 of Fig. 4.
Figure 2:
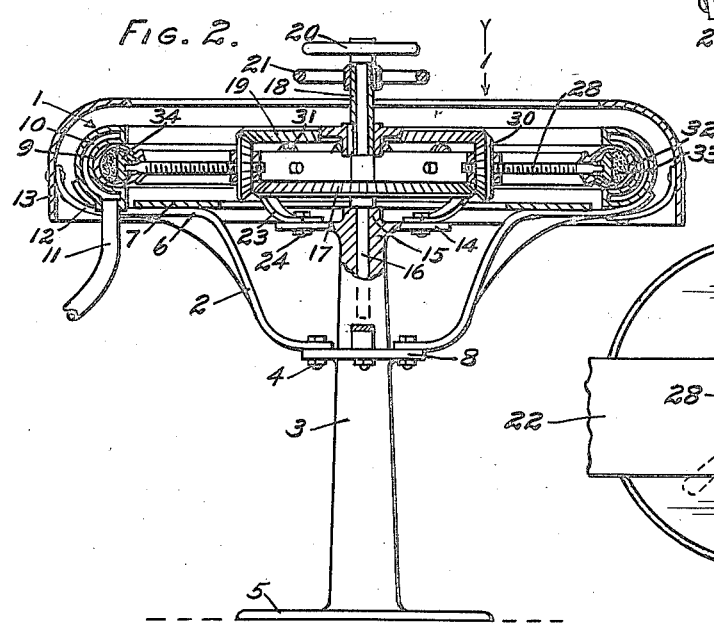
Fig. 2 is a vertical diametrical sectional detail on the line 2—2 of Fig. 1.
Figure 4:
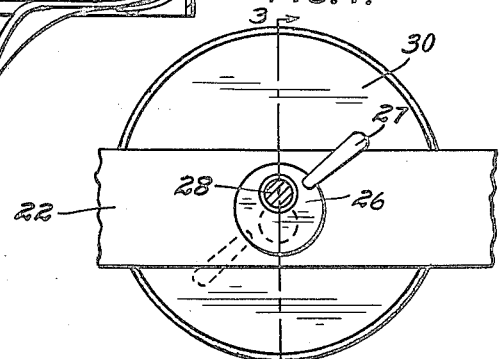
Fig. 4 is a sectional detail on the lines 4—4 of Figs. 1 and 3 and looking in the direction indicated by the arrow.

Fig. 9 is a cross section on the line 9—9 of Fig. 8, and showing an eccentric shell as required to reduce the diameter of the mold as from 34 inch to 32 inch, while reducing the diameter to the tire cavity as from 4 inch to 3 inch.

Referring to the drawings in detail, the annular mold 1 is preferably mounted horizontally, supporting arms 2 extend downwardly and inwardly from the mold 1 and rest upon a pedestal 3 to which they are attached by bolts 4, and the pedestal 3 extends upwardly from a base 5. The arms 2 are curved back and forth nearly to an S shape so as to provide horizontal shoulders 6 upon which an annular platform 7 is mounted. A rim 8 extends outwardly from the pedestal 3 to receive the bolts 4 and support the arms 2.

The mold 1 is shaped to form a shallow tire cavity 9 and a steam chamber 10 for heating the metal forming the cavity 9. A steam pipe 11 leads steam to the chamber 10 and drains the water formed by condensation from the chamber 10. The mold 1 is cast in one piece and forms a continuous annular cavity 9 adapted to receive an entire tire casing and vulcanize the entire retread upon the casing at one operation. The cavity 9 is shallow so that in vulcanizing the new tread the beads and body of the casing are uninjured, and so that the cavity receives only the retread portion of the casing, and so that the casing may be easily snapped into and out of place in the cavity. Preferably the cavity 9 is a half circle in the cross section.

Arms 12 extend outwardly and upwardly from the outer upper ends of the arms 2, and a sheet metal fender 13 is attached to these arms and extends upwardly and inwardly over the mold 1, so that in working over the mold the operator will not come in contact with the mold.

A flange 14 extends outwardly all the way around the extreme upper end of the pedestal 3, a hub 15 extends upwardly from the upper end of the pedestal and a shaft 16 is mounted vertically downwardly through the hub 15 into the pedestal 3. A bevel gear 17 is mounted upon the shaft 16 against the hub 15. The bevel gear 17 is mounted with its face upwardly. A sleeve 18 is mounted upon the upper part of the shaft 16, and a bevel gear 19 is fixed upon the lower end of the sleeve 18 against the hub of the gear 17 with its face downwardly. A handwheel 20 is fixed upon the extreme upper end of the shaft 16, and a second handwheel 21 is fixed upon the extreme upper end of the sleeve 18, so that the gear 17 may be operated by manipulating the handwheel 20, and the gear 19 may be operated by manipulating the handwheel 21. A bearing frame 22 has arms 23 extending downwardly and secured to the flange 14 by bolts 24, and a second bearing frame 25 is mounted inside of the bearing frame 22. Eccentric sleeves 26 are rotatably mounted in the bearing frame 22 and have handles 27 for operating the sleeves. The compression screws 28 are slidingly mounted through the sleeves 26 and through vertically elongated openings 29 in the frame 25. The alternate bevel pinions 30 are mounted between the frames 22 and 25 upon alternate compression screws 28 and in mesh with the bevel gear 19, so that by manipulating a handle 27 the corresponding eccentric sleeve 26 is operated to throw the pinion 30 into or out of mesh with the gear 19. In a like manner the alternate bevel pinions 31 are mounted between the frames 22 and 25 upon the alternate compression screws and in mesh with the bevel gear 17, so that by manipulating a handle 27 the corresponding eccentric sleeve 26 is operated to move the pinion into or out of mesh with the gear 17. The frames 22 and 25 hold the pinions 30 and 31 from endwise movement, and the compression screws 28 are screw seated through the pinions, so that when the pinions are operated they serve as nuts to move the screws 28 in radial lines toward and away from the mold.

The casing 32 is placed in the mold cavity 9, and a filler 33 is placed in the inner tube cavity of the casing 32 either before or after the casing is placed in the mold. The filler 33 should be continuous like an inner tube and may be a canvas tube filled with sand or granulated cork, or a mixture, or it may be any other suitable yielding filler. Segmental shoes 34 are mounted upon the outer ends of the compression screws 28 to fit against the filler 33. The shoes 34 have curved outer faces 35 to form a substantially continuous circle to press against the filler 33. The shoes 34 are preferably connected to the outer ends of the screws 28 by hinges 36.

When it is desired to place a casing in the mold for vulcanizing the retread, the handles 27 are all operated to throw the pinions into mesh with the gears 17 and 19, then the operation of the handwheel 20 in one direction will withdraw one-half of the shoes until the hinges 36 are near the eccentric sleeves 26, and the operation of the other handwheel 21 will withdraw the other half of the shoes until they overlap the first half and contact therewith. Then the casing 32 may be sprung into the mold with the filler 33 in place in the casing, then the handwheels will be operated in the opposite direction first one and then the other to move the shoes outwardly, and the shoes are guided by hand between the beads of the casing into contact with the filler 33. During the operation of the shoes outside of the casing, the ends of the shoes may contact with the platform 7 to prevent the shoes from rotating upon the screws, thereby preventing the screws from rotating with the nuts. After the handwheels have been operated to bring the shoes into contact with the filler and a reasonable amount of pressure applied to the filler the handles 27 may be manipulated so as to operate one or two compression screws at a time to set the filler down tight against the casing to press the rubber into the mold, and after the heat has been applied for a time and the rubber melts, the screws may be set down still farther one or more at a time.

It is obvious that all the shoes cannot be withdrawn simultaneously because the meeting ends would jam together, therefore it is necessary to operate half of the shoes first and then the other half, and for this purpose I have provided two handles and two separate gear connections, and it is obvious that a man could not operate a handwheel with sufficient force to set down four shoes at a time, therefore I have provided throw offs, so that the final compression may be made by operating the screws one at a time.

Furthermore, it is necessary to operate the screws one at a time because it is impossible to make a filler and a casing and a retread of sufficient evenness to give a uniform pressure all the way around as would be necessary if the shoes were all operated simultaneously.

The openings 29 in the frame 25 are so located, that when the pinions 30 and 31 are in mesh with the gears 17 and 19, the screws 28 are at the tops of the openings 29 as required to support the shoes when they are out of the casing and hold the screws 28 from tilting downwardly from under the weight of the shoes.

Referring to Figs. 5 and 6, the casing pullers 37 and 37' are mounted upon the compression screws 28ª and 28ᵇ with the compression screw 28ᶜ between the compression screws 28ª and 28ᵇ, so that the compression screw 28ᶜ carrying the shoe 34 may be withdrawn from the tire casing, the pullers 37 and 37' applied to the tire casing, and then when the screws 28ᵃ and 28ᵇ are operated to pull their shoes out of the casing the casing will be pulled to loosen the casing from the mold.

It is obvious that if the puller were applied to the screw 28ᶜ and this screw operated before the other screws were operated, the casing could not be pulled from the mold, but it is also obvious that if a puller were applied to the screw 28ᶜ, the screws 28ᵃ and 28ᵇ might be operated to withdraw their shoes and then the screw 28ᶜ operated to pull the casing loose from the mold. The pullers 37 and 37' are substantially alike, and each consists of a bearing block 38 slidingly mounted upon a compression screw 28, so that the puller may be moved back and forth on the screw when desired, and clamps 39 and 40 pivotally connected at their centers to the bearing block 38 by pins 41 and 42, and set screws 43 and 44 tapped through the inner ends of the upper clamp 39 against the inner face of the lower clamp 40, so that when the set screws 43 and 44 are loosened the puller is loosened, and when the screws 43 and 44 are screwed downwardly the inner portions of the clamps are forced apart to bring the jaws toward each other to grip the casing 32. Hooked jaws 45 and 46 are formed upon the outer edges of the clamps 39 and 40 to engage the beads 47 and 48 of a quick detachable casing. When the shoe 34 is in position in the casing, the hooked jaws 45 and 46 will engage under the beads and press the edges of the casing tightly against the shoe. Then if a handwheel is operated to move the shoe outwardly the casing must pull loose from the mold or the beads will be pulled from the casing.

In Fig. 7, the clamps 39 and 40 are provided with flat faced jaws 49 and 50 to engage straight side beads 51 and 52 and press the beads and casing against the shoe 34, so as to grip and pull a straight side casing.

As before suggested a single puller may be used by withdrawing the shoes on each side of the puller before the puller is operated, or two pullers may be used by withdrawing the shoe between the pullers before the pullers are operated, and the pullers may be made to fit any of the usual forms of tire casings.

Referring to Figs. 8 and 9, the sectional shell 53 comprises sections 54, 55, 56, 57, 58 and 59 adapted to be inserted into the mold cavity 9 and form a continuous mold cavity 60 reduced both in wheel diameter and in tread diameter and adapted to receive an entire casing, so as to cure the entire retread at a single operation.

If the mold 9 is adapted to receive a casing having a 34 inch wheel diameter and a 4 inch tread diameter and it is desired to reduce the mold to take a casing having a 32 inch wheel diameter and a 3 inch tread diameter, it is necessary that the shell cavity 60 be reduced, so that the thickness of the shell at the bottom of the cavity will be one inch and at the sides of the cavity will be a half inch. Other relative sizes of molds and shells must be laid out upon the same principle, the difference in wheel diameter being provided for at the bottom of the cavity of the shell, and the difference in tread diameter being provided for at the sides of the cavity of the shell.

In order that the sectional shell may be readily inserted into the fixed mold cavity, it is necessary that provision shall be made for inserting the shells from the inside outwardly and at the same time have them fit when seated in place to make a continuous cavity. In Fig. 8, I have shown the sections 54, 55, 56, 57 and 58 meeting on radial lines 62 and the section 59 cut on parallel lines 63 and 64, so that after the sections 54, 55, 56, 57 and 58 have been inserted, the section 59 may be inserted.

It is thought that, if desired, the sections might be all alike and formed to meet on tangential lines, so that the last section may be slid into place to complete the circle.

Various changes may be made without departing from the spirit of my invention as claimed.

I claim:

1. A retread vulcanizer comprising, an annular mold, compression screws mounted radially in the mold, shoes for insertion into the tire casing against a filler, means for operating the screws, and a puller mounted upon one screw and adapted to grip the tire casing and pull the casing loose from the mold.

2. In a retread vulcanizer, an annular mold having a tire cavity, compression screws mounted radially relative to the mold, compression shoes mounted upon the compression screws, and means for operating half of the screws independently of the other half as required to move half of the shoes before the other half is moved.

3. In a retread vulcanizer, an annular mold having a tire cavity, two sets of compression screws mounted radially relative to the mold, compression shoes mounted upon the compression screws and forming a circle, a handwheel connected to operate one set of compression screws, and a second wheel connected to operate the other set of compression screws; so that either set of screws may be operated independently of the other.

4. In a retread vulcanizer, a pedestal, supporting arms extending upwardly and outwardly from the pedestal, an annular mold mounted upon the supporting arms, a hub at the upper end of the pedestal, a shaft mounted vertically in the hub and extending upwardly, a sleeve mounted upon the shaft, two sets of compression screws mounted radially, compression shoes upon the outer ends of the screws, a handwheel upon the upper end of the sleeve, a second handwheel upon the upper end of the shaft, bevel gears connecting the first handwheel to one set of compression screws, and bevel gears connecting the second handwheel to the other set of compression screws; so that either set of compression screws may be operated independently of the other by manipulating the corresponding handwheel.

In testimony whereof I have signed my name to this specification.

EDWARD HARRIS.